United States Patent Office 3,352,273
Patented Nov. 14, 1967

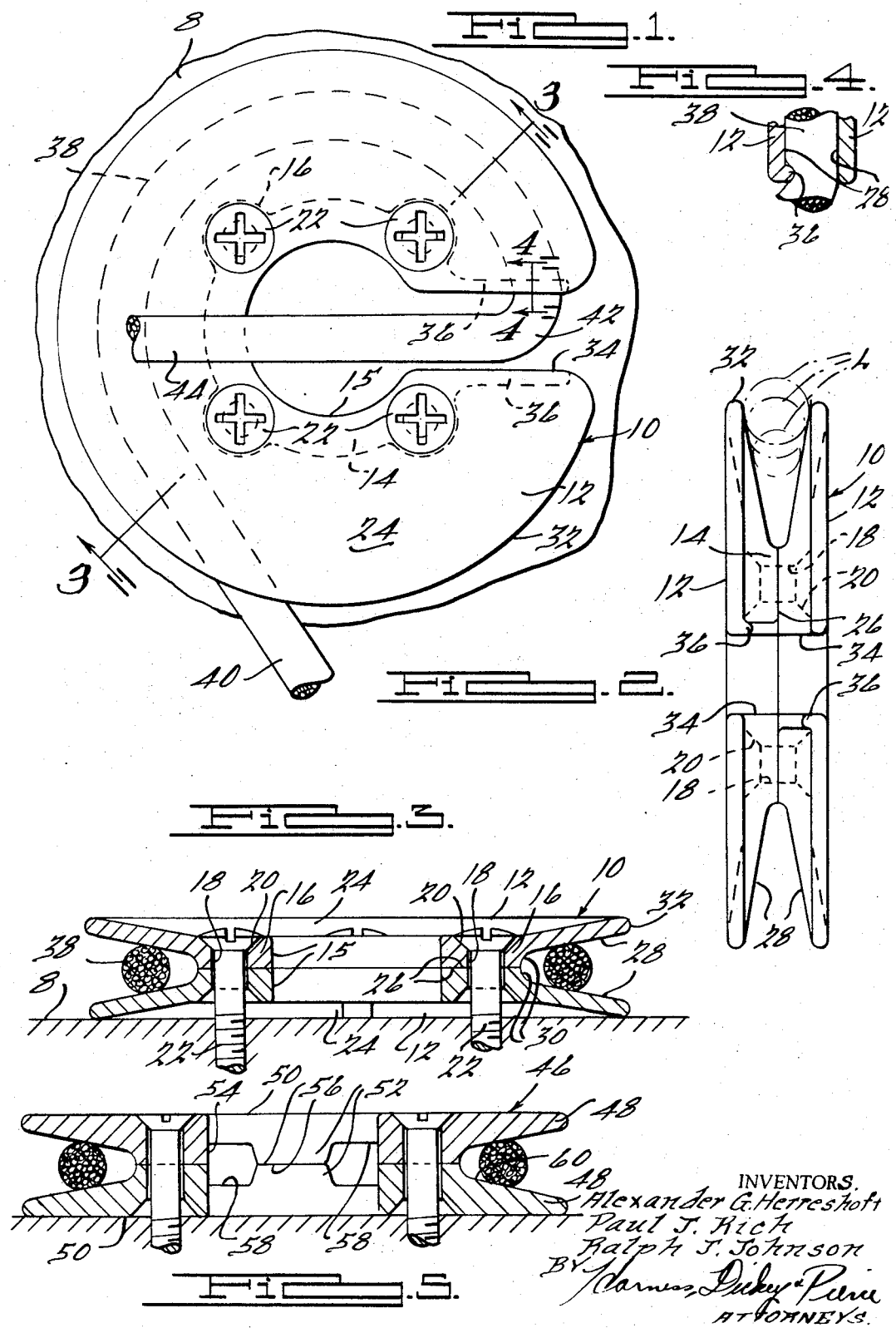

3,352,273
CLEAT
Alexander G. Herreshoff, Grosse Pointe, Paul J. Rich, Orchard Lake, and Ralph J. Johnson, Livonia, Mich., assignors to Algonac Marine Foundry, Inc., Algonac, Mich., a corporation of Michigan
Filed Nov. 2, 1965, Ser. No. 506,082
9 Claims. (Cl. 114—218)

ABSTRACT OF THE DISCLOSURE

A cleat particularly suited for securing lines such as the sheets of a sailboat. The cleat is made from two separate flanges which are secured together so as to the define a circular groove about the periphery thereof. This groove is of V-shaped cross section so that the line will wedge into it. The line passes from the groove through a slot leading to a central opening in the cleat. A rib is formed on one of the flanges adjacent this slot to help hold the line in the slot.

---

This invention relates to cleats for securing a taut line, rope or the like.

It is an object of the present invention to provide a cleat which is highly convenient to use, which may be secured and released with a minimum of effort and a maximum of speed, which may be used with lines of several different diameters, which is sturdy in construction, which has no moving parts, which possesses a long, useful life, which produces very little wear on the lines with which it is used, and which incorporates means holding the line against accidental or inadvertent loosening.

It is another object of the present invention to provide a cleat which is especially adapted for use on boats and particularly sailing craft, which may be mounted flatly on a deck or other flat surface, which has no projecting parts which are subject to being broken off or to catching the clothing of a person, which may be stepped on without tending to trip the person stepping on it, which is self-draining and will not tend to trap water on a deck or other horizontal surface on which it is mounted, and which may be used to snub a taut line as it is payed out.

It is still another object of the present invention to provide a cleat which is relatively reasonable in cost, which utilizes a minimum amount of material, which may be made from metal castings or stampings requiring minimal secondary operations and which may be made from two identical parts defining opposite halves of the cleat, thereby reducing the cost of patterns and other tooling.

These and other objects of the invention will become apparent from the following detailed description taken in conjunction with the accompanying drawings, wherein:

FIGURE 1 is a plan view of a cleat shown mounted on a flat surface and having a line secured thereto;

FIG. 2 is a side elevational view of the structure of FIGURE 1 with parts removed;

FIG. 3 is a sectional view of the structure illustrated in FIGURE 1 taken along the line 3—3 thereof; and FIG. 4 is a view of structure similarly illustrated in FIG. 3 showing another form of the present invention;

FIG. 5 is a sectional view of a slightly modified form of the invention.

Referring now to the drawings, the cleat is illustrated as being fastened to a flat horizontal surface of a member 8, which may comprise, for example, the deck of a sailboat. While the cleat of the present invention is particularly adapted for use on sailing craft, it is to be understood that the cleat may be used for securing ropes and lines in a variety of locations and the invention is not limited to marine hardware.

The cleat consists of a metal body, generally designated at 10, which is made from two identical generally circular flanges or plates 12, each flange 12 being formed with an annular raised portion 14 defining a central opening 15. The raised portion 14 has a plurality of enlarged bosses 16 spaced equally and circumferentially about the central opening 15. The bosses 16 are provided with holes 18 extending completely through the flange 12. The holes 18 have conical counterbores 20 at one end thereof for the reception of the head of a screw 22 or other fastener.

The flanges 12 are formed with a frusto-conical surface 24 on one side thereof. A central flat annular surface 26 is formed on the other side of each flange at the raised portion 14 and bosses 16. The two flanges 12 are placed together so that their surfaces 26 engage one another and so that the openings 18 are in alignment. The cleat is mounted so that the outer edge of the surface 24 of one flange 12 contacts the member 8 to which the cleat is to be fastened.

Located on the same side of each flange 12 as the surface 26, but radially outwardly thereof, is a frusto-conical surface 28. The surfaces 28 of the two flanges 12 are in opposing confronting relationship and diverge radially outwardly away from one another. The space between the surfaces 28 is radially outwardly, forming a groove of generally V-shaped cross-section. The surfaces 28 terminate at their radially inner ends with an arcuate surface 30, while the outer ends of the surfaces 28 merge with a circular outer peripheral edge 32. It will be seen that the surfaces 30 cooperate to define a generally semicylindrical bottom for the V-shaped groove. For the sake of convenience, the V-shaped groove will be referred to by the number 28, which was used to designate the side walls defining the groove.

Each of the flanges 12 is formed with a slot 34 which extends radially between the outer peripheral edge 32 of the flange and the central opening 15 and which also extends completely between the surface 24 on one side of the flange and the surfaces 26, 28 and 30 on the other side of the flange, as may be seen in FIGS. 2 and 4. A radially extending rib 36 is provided on the groove surface 28 of each flange 12 adjacent to one side of the slot 34. The rib 36 and the slot 34 of one of the flanges 12 cooperate in retaining the slack end of the rope, as will be hereinafter described.

The function of the cleat in retaining a line will now be described. A line 38, made from hemp, cotton fibers, nylon, Dacron, or any other desired material, is shown as being wrapped around the groove 28 for slightly over 180°. The rope 38 has a taut end 40 to which a force is applied in a direction away from the cleat. From the taut end 40 the line 38 is wrapped around the groove 28 until it reaches the slot 34. At this point, the line passes upwardly through the slot 34 of the uppermost or outermost flange 12 (that is, the flange away from the mounting member 8). The line 38 leads from the slot 34 into the central opening 15. The end of the line 38 beyond this point is indicated at 44 in FIG. 1 and is slack. As may be seen in FIG. 4, the rib 36 takes a definite bite into the line 38 just as it is bent to enter the slot 34.

The opposite walls of the groove 28 are related to form an included angle of 20° or less and, preferably, an angle of between 15 and 20°. This angle may be described as a "self-locking" or "wedging" angle. The more force which is applied to the taut end 40 of the rope, the more will be the tendency of the rope to wedge down toward the bottom 30 of the groove 28. This only secures the line 38 to the cleat with a greater force. By the time the rope reaches the rib 34 there is practically no longitudinal force acting on it, as this force has all been absorbed by the frictional contact of the sides of the groove 28 with the line before it reaches the rib 34. Accordingly, when the rope is twisted to enter the slot 34, the rib 36 will only bite into the rope 38 with the force that is manually applied to it by "setting" the slack end 44 of the line. The rib 36 and the slot 34 have a combined effect on the rope 38 which will tend to keep the slack end 44 of the rope from coming out of the slot 34. The central opening 15 provides room for the line 38 so that it may pass gradually and smoothly upwardly through the slot 34 without tending to come out of the slot. It has been found that in the absence of the rib 36, the line 38 exhibited a definite tendency to come out of the slot 34. However, the forces that are applied to the line at the rib 36 do not cause the rib 36 to dig so deeply into the line as to rupture the fibers of which the line 38 is made and cause the line to wear excessively. The surfaces 28 are relatively smooth and cause little wear on the line 38.

Looking at FIG. 2, it will be seen that a rib 36 exists on both sides of the slot 34, one being on each flange 12. Therefore, either way that the line 38 is wrapped around the groove 28 and into the slot 34, a rib 36 will bite into the line and keep it from coming out of the slot 34. Also, as is shown in FIG. 2, the groove 28 is capable of accommodating lines of several different sizes, indicated by the letter L. For example, a cleat having a diameter of four inches has been designed for use with lines having diameters of ½, 7/16 or ⅜ of an inch. Another cleat, having a diameter of three inches, has been designed for use with ⅜-inch, 5/16-inch and ¼-inch line.

A slightly modified form of the invention is illustrated in FIG. 5. The figure shows a cleat having a two-part body 46 made from a pair of identical flanges 48, each of which has a flat outer surface 50 arranged so that the surfaces 50 will be parallel to one another. The cleat illustrated in FIG. 5 is further distinguished by the fact that it is provided with a plurality of bosses 52 spaced circumferentially about a central opening 54. The bosses have surfaces 56 parallel to the surfaces 50 and arranged to mate with the surfaces 56 of the other flange 48 with which it is mated. Each flange 48 is devoid of any material around the opening 54 in the spaces between the bosses 52, thereby leaving openings 58 at the bottom of a V-shaped groove 60 formed by the flanges. The construction shown in FIG. 5 permits the parts to be mated together as desired, but reduces the amount of material required in the area of the center of the cleat. Functionally, the cleat of FIG. 4 is substantially identical to the cleat of FIG. 5.

The cleats illustrated herein are desirably made as castings. It will be appreciated that each flange 12 may be cast by the use of the same pattern. After each flange 12 is cast, its surface 26 may, if desired, be ground to assure complete flatness. The casting may be plated and buffed if it is desired to impart a chrome surface to the cleat. Of course, it will be appreciated that the question of the surface finish of the cleat is entirely optional. By the use of certain alloys, a cleat designed for marine usage may be provided which requires no plating but which may be tumbled to improve its surface appearance.

It will be apparent that as mounted on the surface 8, the cleats illustrated herein will not hold water on the surface 8 in the opening 15, inasmuch as the slot 34 of the lowermost flange 12 provides drainage so that rain water or the like will run out of the cleat.

While the preferred embodiments of the invention illustrated herein are well calculated to fulfill the objects above stated, it will be apparent that the invention is susceptible to modification, variation and change without departing from the fair meaning or scope of the subjoined claims.

What is claimed is:

1. A boat cleat for securing a line or the like, including a body having a central opening and a pair of generally parallel flanges of substantially equal diameter extending radially outwardly from said opening, said flanges being provided with a pair of outwardly divergent adjacent faces defining a groove therebetween which is open to the outer periphery of said body, one of said flanges having a slot therethrough extending inwardly into said central opening from the outer periphery of said body, and means disposed between said opening and said groove for mounting said body with the other of said flanges disposed against a mounting surface, the other of said flanges having means providing for the drainage of water from the opening.

2. A boat cleat for securing a line or the like, including a body having a central opening and a pair of generally parallel flanges of substantially equal diameter extending radially outwardly from said opening, said flanges being provided with a pair of outwardly divergent adjacent faces defining a groove therebetween which is open to the outer periphery of said body, one of said flanges having a slot therethrough extending inwardly into said central opening from the outer periphery of said body, and the other of said flanges having a mounting surface on the outer side thereof generally parallel to said groove, and means defining a plurality of fastener receiving apertures extending through said body between said central opening and said groove in a direction generally perpendicular to said groove.

3. A cleat including a pair of generally circular flanges provided with a peripheral groove therebetween of generally V-shaped cross section, a slot formed in at least one of said flanges and extending radially inwardly from the outer periphery thereof, and a rib formed on one of said flanges adjacent said slot, said rib projecting into said groove and being operable to bite into a line passing from said groove into said slot to help secure said line in said slot.

4. A cleat for securing a line or the like, including a body having a central opening and a pair of generally parallel flanges extending radially outwardly from said opening, said flanges being provided with a pair of outwardly diverging adjacent faces defining a groove therebetween which is open to the outer periphery of said body, one of said flanges having a slot therethrough extending inwardly into said central opening from the outer periphery of said body, and a rib formed on at least one of said flanges adjacent said slot, said rib extending in a generally radial direction in said groove and being operable to bite into a line passing from said groove into said slot.

5. A boat cleat for securing a line or the like, including a pair of separate generally circular flange members disposed in adjacent relation and defining an annular groove therebetween of V-shaped cross section which is open to the outer periphery of the cleat, said flange members having aligned central openings and fastener receiving apertures therethrough spaced circumferentially about said central openings and disposed radially inwardly of said groove for securing said flange members together and for securing said flange members to a mounting surface and a slot formed in one of said flange members extending radially inwardly from the outer periphery thereof between a pair of fastener receiving apertures to said central opening whereby a line secured in said groove may be passed through said slot into the central openings.

6. A cleat for securing a line or the like, including a pair of identical flanges disposed in adjacent relationship and defining a groove therebetween extending around the outer periphery of the cleat, each of said flanges having a central opening, a slot extending from the outer periphery thereof to said central opening and a radially extending rib projecting into said groove adjacent said slot, the slots of said flanges being disposed in alignment and the rib of one flange being disposed on one side of said aligned slots and the rib of the other one of said flanges being disposed on the other side of said aligned slots whereby a line may be passed into one of said slots from the portions of said groove on either side thereof and one of said ribs will bite into said line to help hold said line in said slot.

7. A boat cleat for securing a line or the like, including a pair of generally circular identical flanges disposed in confronting relationship and defining a groove therebetween of generally V-shaped cross section extending about the outer periphery of said cleat, said flanges having aligned central openings and a plurality of fastener receiving means disposed between said groove and said central openings and spaced circumferentially about said central openings, and a slot formed in each of said flanges extending from the outer periphery of said cleat radially inwardly between an adjacent pair of said fastener receiving means to the central opening thereof for the passage of a line from said groove through one of said slots to said central opening.

8. A boat cleat for securing a taut line or the like, including a body having a pair of generally circular identical flanges disposed in confronting relation and defining a generally annular groove therebetween of generally V-shaped cross section open to the outer periphery of said cleat, each of said flanges having a central continuous annular portion disposed radially inwardly of said groove and defining a central opening in said cleat, a plurality of fastener receiving apertures in the annular portions of said flanges and a plurality of fasteners passing through said apertures for holding said flanges together and holding said cleat to a supporting structure, and a slot formed in each of said flanges extending from the outer periphery of the cleat to said central openings for the passage of a line through one of said slots to said central opening.

9. A boat cleat for securing a taut line or the like, including a pair of generally circular identical flanges disposed in confronting relation and defining a groove therebetween of generally V-shaped cross section extending about the outer periphery of said cleat, said flanges having aligned central openings and a plurality of aligned bosses spaced circumferentially about said central opening, said bosses having aligned fastener receiving openings for the reception of fasteners to hold said bosses together and to hold the cleat to a mounting structure, each of said flanges having a slot extending from the outer periphery thereof to its said central opening for the passage of a line from said groove through one of said slots to said central opening.

References Cited

UNITED STATES PATENTS

| 206,255 | 7/1878 | Lockhart | 24—127 |
| 279,274 | 6/1883 | Patterson | 24—127 |
| 1,960,171 | 5/1934 | Seeger | 114—218 X |
| 2,202,968 | 6/1940 | Simler | 24—127 |

FERGUS S. MIDDLETON, *Primary Examiner.*

MILTON BUCHLER, *Examiner.*

B. BELKIN, *Assistant Examiner.*